United States Patent [19]
Hartman et al.

[11] Patent Number: 5,348,616
[45] Date of Patent: Sep. 20, 1994

[54] METHOD FOR PATTERNING A MOLD

[75] Inventors: Davis H. Hartman, Phoenix; Michael S. Lebby, Apache Junction, both of Ariz.

[73] Assignee: Motorola, Inc., Schaumburg, Ill.

[21] Appl. No.: 55,579

[22] Filed: May 3, 1993

[51] Int. Cl.[5] .............. B44C 1/22; C23F 1/00
[52] U.S. Cl. ................... 156/643; 156/654; 156/659.1; 156/905
[58] Field of Search ............. 156/630, 643, 654, 656, 156/657, 659.1, 662, 663, 664, 905

[56] References Cited

U.S. PATENT DOCUMENTS

| | | | |
|---|---|---|---|
| 4,321,105 | 3/1982 | Melonio et al. | 156/660 |
| 4,437,924 | 3/1984 | Weglin | 156/651 |
| 4,582,566 | 4/1986 | Grey | 156/905 X |

OTHER PUBLICATIONS

Toshio Yuhta et al. Bull. Japan Soc. of Prec. Engg., vol. 17, Mar. 1983.

*Primary Examiner*—William Powell
*Attorney, Agent, or Firm*—Gary F. Wittig; Eugene A. Parsons

[57] ABSTRACT

A mold substrate having a major surface is provided. A patterned masking layer is formed on the major surface of the mold substrate that exposes portions of the major surface of the mold substrate while other portions are covered by the patterned masking layer. The major surface of the mold substrate is etched, thereby removing exposed portions of the major surface of the mold substrate, and thus transferring the pattern from the patterned masking layer to the major surface of the mold substrate.

18 Claims, 4 Drawing Sheets

METHOD FOR PATTERNING A MOLD

BACKGROUND OF THE INVENTION

This invention relates, in general, to mold manufacturing and, more particularly, to generation of patterns and transferring of the patterns to molding surfaces of the mold.

At present, materials used for making transfer molds and injection molds typically are very hard durable metals, such as steel, high carbon steel, and the like. Patterning or shaping of these materials into various geometric patterns that ultimately defines geometric forms of the molded objects is a very difficult task.

Generally, shaping or patterning of molds is achieved by several machine technologies, such as milling, grinding, and wire electronic discharge machining (EDM) that cut away or remove material from the mold, thus slowly shaping the mold to a desired form. However, these machine technologies do not provide sufficient precision, accuracy, or resolution required for patterning of molds used for optical applications. At best, these technologies provide precision, accuracy, and resolution of only ±2 microns, thus not enabling the patterning of molding beyond these limits.

Moreover, these machine technologies generally are only capable of straight line structures, thus not allowing a variety of geometric forms or patterns to be transferred into molding surfaces of the mold, thus severely limiting the patterning capability of making molds. This limitation of patterning capability in turn limits objects that are capable of being molded. Further, profiles of the patterns generated by these machine technologies are dictated by the shape and size of a tool used in each specific technology for generating the pattern. However, a greater degree of shape specificity is required in today's and tomorrow's molding environment.

It can be readily seen that conventional removal or cutting away methods of patterning molds have severe limitations. Also, it is evident that conventional processing used for making these patterns are not capable of being able to provide geometric variations which further limit the ability of creating molded objects. Additionally, as profiles of molded objects become increasingly important, methods used at present are not capable of providing profile shapes that are required for molds, hence the molded objects. Therefore, a method for patterning molds that provides greater precision, accuracy, feature size, a variety of geometric patterns, and enable profile determination to be refined would be highly desirable.

SUMMARY OF THE INVENTION

Briefly stated, an article and method for transferring a pattern to a mold are provided. A mold substrate having a major surface is provided. A pattern masking layer is formed on the major surface of the mold substrate that exposes portions of the major surface of the mold substrate while other portions are covered by the patterned masking layer. The major surface of the mold substrate is etched, thereby removing exposed portions of the major surface of the mold substrate, and thus transferring the pattern from the pattern masking layer to the major surface of the mold substrate.

DETAILED DESCRIPTION OF THE DRAWINGS

Figure 1:
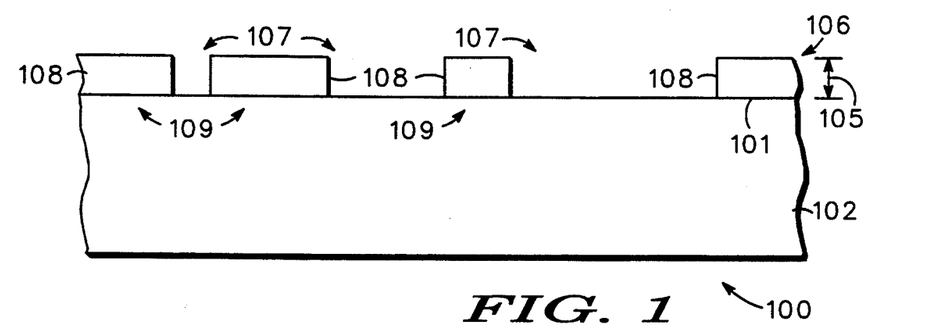
FIGS. 1–3 illustrate sequential steps of a method for manufacturing and patterning a mold.
Figure 2:
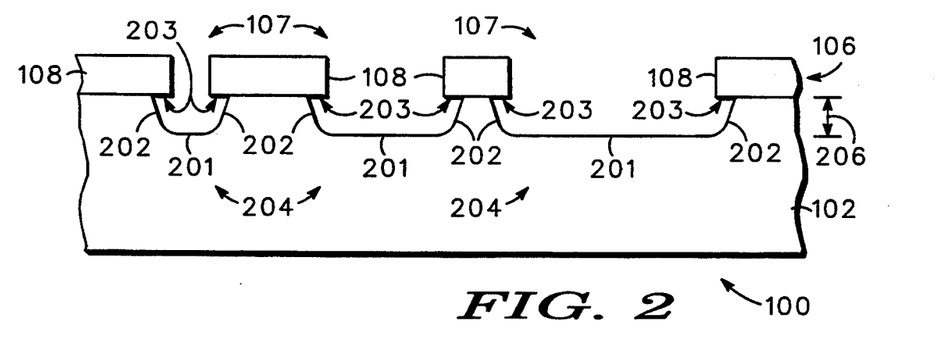
Figure 3:
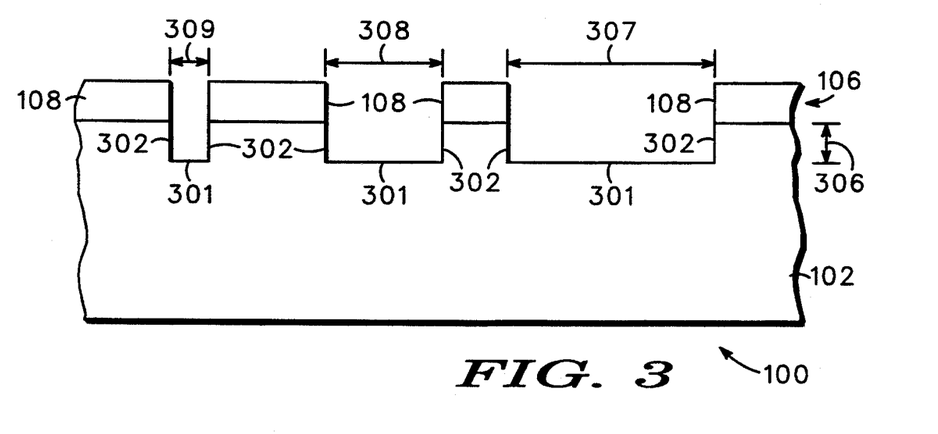

FIGS. 1–3 are highly enlarged simplified illustrations demonstrating a sequence of steps for patterning a major surface or a surface 101 of a mold substrate or a substrate 102 for manufacturing a mold 100. It should be understood that mold 100 is greatly simplified, thus only illustrating pertinent parts of mold 100 for greater clarity and greater understanding of the present invention. Moreover, it should be further understood that by simplifying mold 100 in the FIGS. 1–9, for the above stated purpose, various portions of mold 100 have been left out of FIGS. 1–9.

Referring now to FIG. 1, mold 100 is partially shown having mold substrate or substrate 102 with surface 101, wherein surface 101 has been previously prepared and is now ready for patterning. Generally, substrate 102 is made of any suitable material, such as a glass material, a semiconductor material, a metal material, a metal alloy material, or the like. Further, material used for substrate 102 is capable of being coated with another material, such as diamond material, dielectric material, e.g., silicon dioxide, silicon nitride, silicon oxynitride, metal and metal alloy material, e.g., tungsten, titanium, and the like.

Typically, surface 101 is cleaned or prepared for subsequent processing by any suitable well-known method in the art, such as mechanically cleaning or chemically cleaning so as to remove or clean debris, particles, organic material, and the like from surface 101.

After surface 101 has been prepared, a radiation sensitive material is applied to surface 101 to form a radiation sensitive film or radiation sensitive layer 106. Typically, the radiation sensitive layer 106 is any suitable organic polymer, such as photoresist, polyimide, polymethyl methacrylate (PMMA), or the like that is reactive to radiation, such as light, electrons, ions, and the like. Application of the radiation sensitive film 106 onto surface 101 is achieved by any suitable well-known method, such as spray coating, spin coating, laminating, or the like. Thickness 105 of radiation sensitive film 106 is application specific, i.e., thickness 105 of radiation sensitive film 106 is determined by several factors, such as resolution of features that are to be defined, spaces between the features that are to be defined, and etch characteristics of the radiation sensitive film 106 itself.

For example, with radiation film 106 being photoresist and with resolution of the features to be defined having sizes that approximately range from 0.4 micron to 1.0 micron, thickness 105 of the photoresist film used for resolving the features to be defined has an approximate range of 5,000 angstroms to 15,000 angstroms. Additionally, if the features to be defined are larger than 1.0 micron, thickness 105 of the photoresist film is capable of ranging from approximately 15,000 angstroms to 500,000 angstroms. However, it should be understood that feature size is not the only consideration used for determining thickness 105 of radiation film 106 and that other considerations, such as durability or etch resistance of radiation sensitive material, material compatibility of the radiation sensitive material with other processes, and the like play an important part in determining thickness 105 of layer 106.

Once radiation sensitive layer 106 has been applied to surface 101, radiation sensitive layer 106 is exposed to a radiation source (not shown) that exposes portions of radiation sensitive layer 106 while other portions are unexposed. Generation of the exposed and unexposed portions of radiation sensitive layer 106 is achieved by any suitable lithographic method, such as contact lithography, projection lithography, E-beam lithography, ion beam lithography, or the like. By exposing radiation sensitive layer 106 with a suitable lithographic method, precision and accuracy of placement of a feature or features of 0.25 micron is capable of being achieved. Further, by exposing radiation sensitive layer 106 with a suitable lithographic method, resolution of a feature or features of 0.4 micron is capable of being achieved.

After exposure of radiation sensitive film 106 on surface 101 of substrate 102 is completed, radiation sensitive film 106 is developed, thus generating exposed portions 107 of surface 101 and islands 108 of radiation sensitive layer 106 that cover portions 109 of surface 101. It should be understood that islands 108 form a patterned masking layer used for etching substrate 102 in this particular embodiment of the present invention. Islands 108 of radiation sensitive layer 106 are used to protect or cover portions 109 during a subsequent etch or etching procedures described hereinbelow. Additionally, it should be understood that while the above description uses a positive photoresist scheme, one skilled in the art would be able to use a negative photoresist scheme.

By way of example, with mold substrate 102 being made of high-carbon steel and with surface 101 of substrate 102 prepared for application of radiation sensitive film 106, radiation sensitive film 106 is applied to surface 101 of substrate 102. In a preferred embodiment of the present invention, radiation sensitive film 106 is a photoresist material such as AZ1350 made by Hoechst Celanese Corporation, or the like. Thickness 105 of the photoresist film ranges between 10,000 angstroms to 18,000 angstroms with exact thickness 105 of the photoresist film being application specific. For this specific example, minimum features to be defined will be approximately 1.0 micron, thus thickness 105 of the photoresist film range between 7,000 angstroms to 13,000 angstroms. However, it should be understood larger minimum feature sizes and smaller minimum feature sizes generally use thicker and thinner thickness of photoresist film 106, respectively. Additionally, material compatibility issues are also considered.

Exposure of the photoresist film typically is achieved by utilizing a photolithographic system, such as a 1:1 scanning system, a reduction step and repeat system, a contact printing system, or the like. In a preferred embodiment of the present invention, either the 1:1 scanning system or the reduction step and repeat system is used to expose the photoresist film on surface 101. By exposing the photoresist film with one of the photolithographic systems, it allows images with minimum feature sizes of 0.4 microns to be resolved into the photoresist. Further, the images are also capable of having many different shapes, such as curves, triangles, and the like.

Once the photoresist film has been exposed, the photoresist film is developed by any suitable well-known method in the art. Basically, a basic solution is applied to the photoresist film. The basic solution reacts with the exposed portions of the photoresist film and washes the exposed portions of the photoresist film away, thus opening or exposing portions 107.

Referring now to both FIGS. 1 and 2, chemical etching of surface 101 of substrate 102 generally is achieved by selecting either a wet etch method or a dry etch method. In general, the wet etch method is achieved by applying a wet chemistry or a wet etchant to surface 101 having exposed and unexposed portions 107 and 109, thus allowing exposed portions 107 to be chemically or isotropically etched. During the isotropic etch, exposed portions 107 of substrate 102 are removed generating surfaces 201 with curved segments 202. Additionally, undercuts 203 are also generated as a result of the isotropic etching. More specifically, undercuts 203 are generated as a result of the isotropic etch not having a specific directionality component, thus etching all surfaces, capable of being etched, at similar rates, thereby generating undercuts 203 under islands 108.

Regarding the wet etch method, selection of a wet etch solution or wet etchant used for etching surface 101 having exposed and unexposed portions 107 and 109 is dependent upon material involved. For example only, if substrate 102 is made of glass or if substrate 102 is made of steel, etch solution or etchant of hydrofluoric acid (HF) is used to etch the glass substrate 102, while a wide variety of proportions of nitric acid ($HNO_3$), HF, and sulfuric acid ($H_2SO_4$) is used to etch the metal substrate 102. However, it should be understood that use of $H_2SO_4$ is capable of removing organic material such as photoresist; therefore, use of $H_2SO_4$ in the wet etch solution needs to be used with material compatibility issues in mind. Typically, application of the wet chemical solution to surface 101 having exposed and unexposed portions 107 and 109 is achieved by any suitable method, such as directly spraying the wet etchant onto surface 101, immersing mold 100 into a solution containing the wet etchant, or the like, thus isotropically etching exposed portions 107 of surface 101.

In a preferred embodiment of the present invention, with substrate 102 being high carbon steel and prepared as illustrated in FIG. 1, surface 101 having exposed and unexposed portions 107 and 109 of substrate 102 is etched using the wet chemical method. Generally, approximately equal portions of $HNO_3$ and HF are mixed to provide an etchant solution. The etchant solution is then applied to surface 101 of substrate 102 by any suitable method, such as a spraying system, a cascading system, or an immersion tank. Generally, etching of surface 101 of substrate 102 is continued until a predetermined depth 206 is reached. However, it should be understood that while longer exposure times to the etchant increase predetermined depth 206, longer exposure times to the etchant also increases undercut 203. Further, if surface 101 of substrate 102 is etched for too long of a period of time or over etched, islands 108 of radiation sensitive film 106 will be totally etched under or undercut, thereby removing islands 108 from surface 101.

Alternatively, isotropically etching of surface 101 having exposed and unexposed portions 107 and 109 of substrate 102 is also capable of being accomplished with the dry etch method. Basically, the dry etch method is achieved by generating a gaseous plasma (not shown) in a reactor (not shown) to generate etch species that are directed toward surface 101 having exposed and unexposed portion 107 and 109 of substrate 102. Generation of gaseous plasmas have been known for sometime, thus need not be discussed in great detail herein. However, it should be understood that use of the gaseous plasma to etch exposed portions 107 allows for a capability of dynamically shifting the gaseous plasma between chemical etching that is isotropic and physical etching that is anisotropic.

Generally, chemical or isotropic etching in a gaseous plasma is achieved by selecting process parameters, such as high pressure, low power, and low bias, thus allowing a more chemical interaction to take place between exposed portions 107 surface 101 and the etch species. Conversely, anisotropic etching in a gaseous plasma generally is achieved by selecting process parameters, such as low pressure, high power, and high bias, thus allowing a more physical interaction to take place between exposed portions 107 of surface 101 and the etch species. Additionally, it should be understood that physical configurations of the reactor, as well as process gases used to generate the plasma are capable of changing absolute values of the process parameters to a large extent.

In general, use of the dry chemical etch method for chemically etching or isotropically etching exposed portions 107 of surface 101 is achieved by applying etch species generated by the gaseous plasma with process parameters selected for chemical etching or isotropic etching to surface 101, thus allowing exposed portions 107 to be chemically or isotropically etched. Typically, photolithographically prepared surface 101 of substrate 102, as shown in FIG. 1, is placed in close association or immersed in the gaseous plasma, thus allowing the exposed portions 107 to be isotropically etched. Process gases used to generate the gaseous plasma, which in turn generate the etch species, are halogen containing gases, such as chlorine, fluorine, bromine, and iodine containing gases. More specifically, gases that typically are used include hydrogen chloride (HCl), chlorine ($Cl_2$), hydrogen bromide (HBr), boron trichloride ($BCl_3$), sulfur hexafluoride ($SF_6$), and the like. Moreover, it should be evident that other sulfur fluorides, carbofluorides, borochlorides, iodides, and bromides are capable of being used as well.

In a preferred embodiment of the present invention, with substrate 102 being high carbon steel and prepared as illustrated in FIG, 1, surface 101 having exposed and unexposed portions 107 and 109 of substrate 102 is etched using the dry chemical method. Generally, exposed portions 107 of surface 101 are exposed to a gaseous plasma configured for isotropic etching having a fluorine component. It should be understood that a wide variety of fluorine containing gasses are available for generating the gaseous plasma, as well as a wide variety of plasma reactors, such as barrel reactors, down stream microwave reactors, and parallel plate reactors in which the gaseous plasma is capable of being generated. Additionally, it should be understood that additional gases, such as Oxygen ($O_2$), Helium (He), or the like are sometimes added to increase reactivity of the gaseous plasma.

Typically, process parameters used to generate the gaseous plasma with isotropic etching characteristics have a pressure range from 500 millitorr to 2.0 torr, power level range from 50 watts to 700 watts, and bias levels range from neutral to 500 volts. However, it should be understood that specific process parameters vary greatly depending upon specific application, as well as with specific reactor configuration.

Referring now to both FIG. 1 and 3, FIG. 3 is a cross-sectional illustration of mold 100 after being prepared and etched in an anisotropic manner. Etching of exposed portions 107 of surface 101 with an anisotropic method result in surface 301 and sidewalls 302 being directly transferred into substrate 102, thus maintaining dimensional integrity between islands 108 and surfaces 301. Use of the anisotropic method to etch mold 100 provides several advantages, such as direct transfer from islands 108 to surface 101 of mold 100, thereby achieving a greater control of critical dimensions as defined by islands 108.

In general, use of the dry etch method for anisotropic etching of exposed portions 107 of surface 101 is achieved by applying etch species generated by the gaseous plasma with process parameters selected for anisotropic etching and directing the etch species to surface 101, thus allowing exposed portions 107 to be physically and chemically etched. Typically, photolithographically prepared surface 101 of substrate 102, as shown in FIG. 1, is placed on an electrode having a large DC Bias that is used to generate the gaseous plasma, thus allowing the etchant species to be electrically attracted to exposed portions 107 of surface 101 so as to be anisotropically etched. Process gases used to generate the gaseous plasma, which in turn generate the etch species, are halogen containing gases, such as chlorine, fluorine, bromine, and iodine containing gases. More specifically, gases that typically are used include hydrogen chloride (HCl), chlorine ($Cl_2$), hydrogen bromide (HBr), boron trichloride $BCl_3$), sulfur hexafluoride ($SF_6$), and the like. Moreover, it should be evident that other sulfur fluorides, carbofluorides, borochlorides, iodides, and bromides are capable of being used as well.

In a preferred embodiment of the present invention, with substrate 102 being high carbon steel and prepared as illustrated in FIG. 1, surface 101 having exposed and unexposed portions 107 and 109 of substrate 102 is etched using the dry anisotropic etch method. Generally, mold 100 is placed into a plasma reactor (not shown) that is capable of achieving an anisotropic etch. Typically, these reactors utilize a DC bias voltage that is connected to mold 100, thus making mold 100 part of the electrical configuration of the reactor. By providing mold 100 with the DC bias voltage, ions from the gaseous plasma are physically directed toward exposed portions 107 of surface 101 of mold 100 in a perpendicular fashion, thus directionally etching exposed portions 107 perpendicularly to provide surface 301 and sidewalls 302, while surface 109 is protected by islands 108 of layer 106.

Gases used to generate the gaseous plasma are similar to the gases discussed hereinabove; however, the process parameters are selected to enhance the physical characteristics of the etch, thus anisotropically etching mold 100. More specifically, the dry anisotropic etch method uses process parameters such as pressure, power, and DC bias range from 5.0 millitorrs to 500 millitorrs, 500 watts to 1,500 watts, and 200 volts to 800 volts, respectively. However, it should be understood that specific and absolute values for process parameters vary greatly depending up specific gas or gases and reactor configuration.

Utilization of anisotropic etching enables a direct transfer of geometric patterns embodied in islands 108 to be etched into surface 101 of mold 100, thus enabling features generated by islands 108 with specific dimensions to be transferred in surface 101 with dimensional control. Additionally, it should be understood that radiation sensitive layer 106 such as photoresist have some incompatibility problems when used with chlorine or bromine plasmas, i.e., photoresist is etched as well as exposed portions 107, thus affecting depth 306. As a result, depth 306 is limited by etch rate of the photoresist and etch rate of exposed portions 107 of surface 101. However, it should be realized that depth 306 is capable of being increased by overlaying and repeating photolithography and etching steps.

Figure 4:
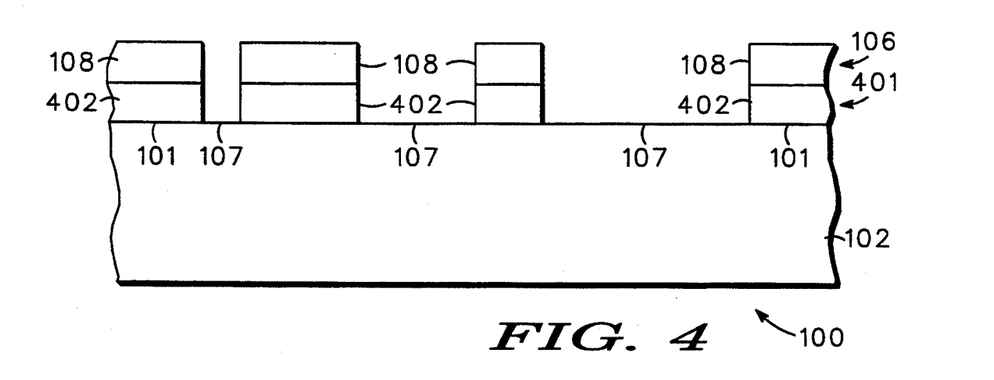
FIGS. 4–6 illustrate another sequence of processing steps for manufacturing and patterning a mold.
Figure 5:
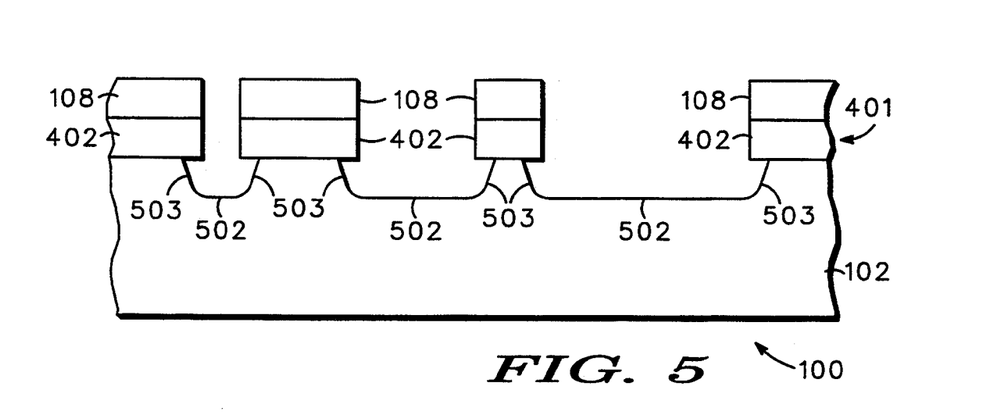
Figure 6:
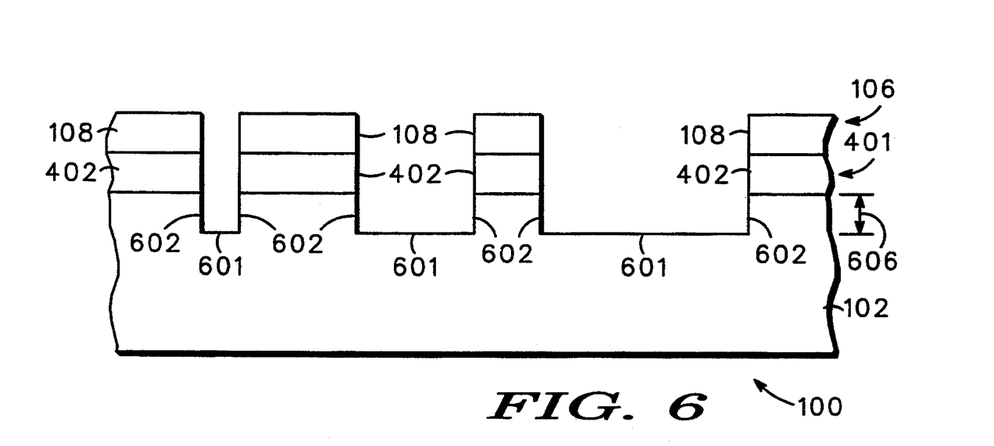

FIGS. 4-6 illustrate an alternative method for patterning of surface 101 of mold 100. Similar or identical features having similar or identical functions have retained original numbers that were identified in FIGS. 1-3.

FIG. 4 illustrates a cross-sectional view of surface 101 of mold 100 as generally prepared and described in FIG. 1. However, prior to application of radiation sensitive layer 106, a hard mask layer 401 is applied to surface 101 of mold 100. Further, FIG. 4 illustrates a cross-sectional view of mold 100 after patterning and etching or removal of portions of hard mask layer 401.

Typically, hard mask layer 401 is made of any suitable material, such as silicon dioxide ($SiO_2$), silicon nitride ($Si_3N_4$), silicon oxynitride ($Si_3O_xN_4$) where $O_x$ is the amount of Oxygen in the material, or the like. Application of hard mask layer 401 typically is achieved in a Plasma Enhanced Chemical Vapor Deposition (PECVD) reactor as a continuous film or layer that covers entire surface 101 of substrate 102. Subsequently, radiation sensitive layer 106 is applied to hard mask layer 401. After radiation sensitive layer 106 is applied on hard mask layer 401, radiation sensitive layer 106 is exposed and developed as previously described in connection with FIGS. 1-3 and associated text. However, by developing radiation sensitive layer 106, portions (not shown) of hard mask layer 401 are exposed. Subsequently, the portions of hard mask layer 401 are removed by etching, thereby exposing portions 107 of surface 101, as well as generating islands 402. Etching of hard mask layer 401 typically is achieved by either a wet etch method, such as an aqueous HF solution or a dry etch method, such as a gaseous plasma containing fluorine. However, in a preferred embodiment of the present invention, dry etching with an anisotropic method is used so as to maintain critical dimensions of the portions of hard mask layer 401, thus exposing portions 107 with similar dimensions defined by islands 108.

Generally, the etching of hard mask layer 401 is achieved in a plasma reactor that is designed for anisotropic etching. Typically, etch chemistries for achieving the removal of portions of hard mask layer 401 is accomplished by fluorine containing plasmas. As discussed hereinabove, anisotropic etching is a function of pressure, DC bias voltage, power, and the physical configuration of the reactor.

Once the portions of hard mask layer 401 have been removed, exposed portions 107 are capable of being etched, thus transferring geometric pattern of islands 108 into surface 101 of mold 100 as described hereinabove in FIGS. 1-3 and associated text. It should be understood that islands 108 and islands 402 both form a patterned masking layer used for etching substrate 102 Additionally, it should be further understood that materials used to make hard mask layer 401 need to be selected carefully so as to avoid material incompatibilities with etchants.

Referring now to both FIGS. 4 and 5, FIG. 5 illustrates a cross-sectional view of mold 100 after an isotropic etching process of exposed portions 107 of surface 101 resulting in surfaces 502 with curved segments 503. Typically, the isotropic etch processes are performed as previously described hereinabove in FIG. 2 and associated text, using either the wet chemical etch processes or the dry chemical etch processes.

Regarding the wet chemical etch of exposed portions 107 of mold 100 prepared as illustrated in FIG. 4, selection of materials used for hard mask layer 401 needs to be chosen with care; i.e., the materials used for islands 402 are etch resistant to the wet chemical etchant. For example, with the wet chemical etch having HF as a component, either silicon nitride or silicon oxynitride are preferred for making islands 402 from layer 401 since both silicon nitride and silicon oxynitride are etch resistant HF acid.

Regarding the dry chemical etch of exposed portions 107 of mold 100 prepared as illustrated in FIG. 4, selection of material used for hard mask 406 also need to be chosen with care; i.e., the material used for islands 402 needs to be resistant to the etchant in the dry chemical etch. For example, with the dry chemical etch having Cl as a component, silicon dioxide ($SiO_2$) is preferred for making islands 402 since $SiO_2$ is resistant to Cl etchants generated from chlorine plasmas, thus enabling removal of exposed portions 107 while not significantly effecting islands 402 of hard mask layer 401.

Referring now to both FIGS. 4 and 6, FIG. 6 illustrates a cross-sectional view of mold 100 after anisotropic etch of exposed portions 107 of surface 101, thus resulting in surfaces 601 and sidewalls 602 of mold 100 as shown in FIG. 4. Chemistries used to anisotropically etch mold 100 have been previously described herein above in FIG. 3. Additionally, use of islands 108 and islands 402 of radiation sensitive material 106 and hard mask layer 402, respectively, allows for harsher chemistries to be utilized so as to increase desired depth 606, thus allowing surface 601 to be etched to a deeper depth that provides greater versatility for patterning mold 100. Additionally, the use of harsher chemistries to etch exposed portions 107 of surface 101 increases speed of removal of exposed portions 107 of surface 101, thus achieving a more manufacturable process.

Figure 7:
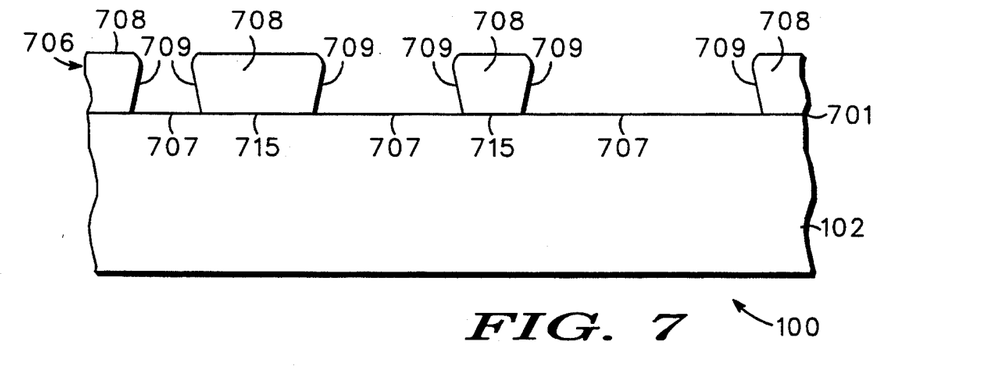
FIGS. 7–9 illustrate yet another sequence of sequential processing steps for patterning a mold.
Figure 8:
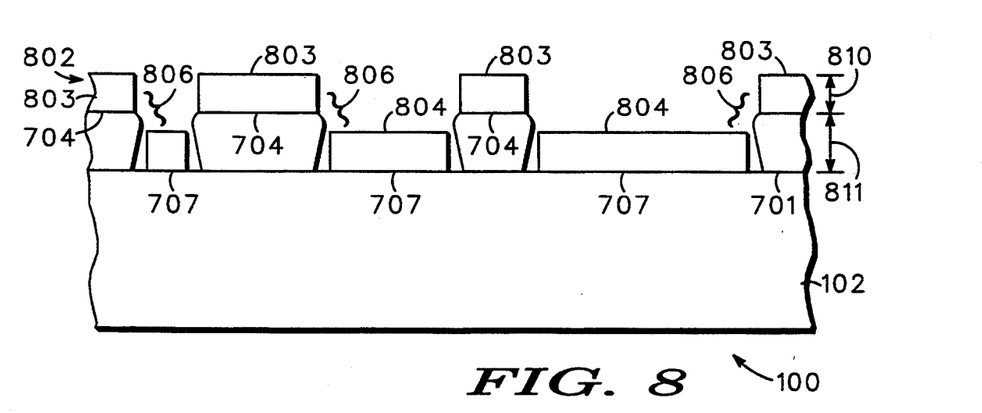
Figure 9:
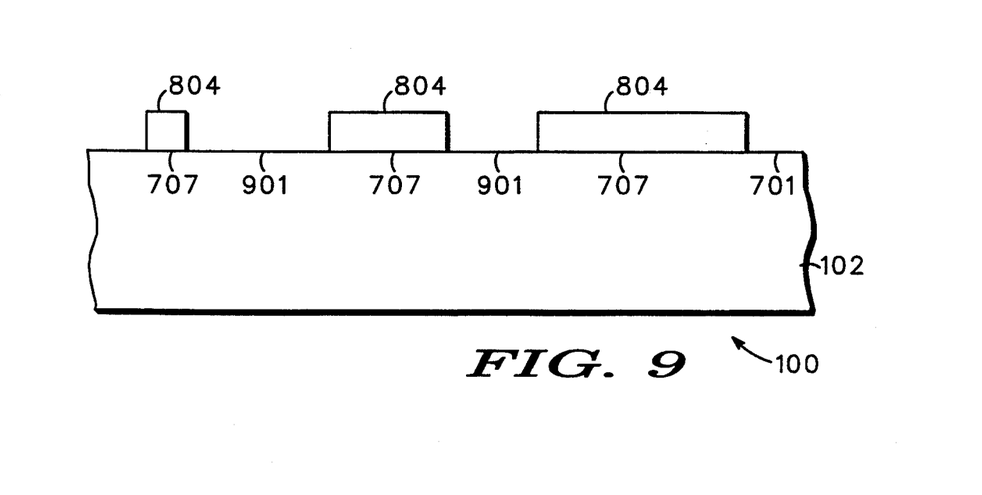

FIGS. 7-9 illustrate yet another method for patterning surface 101 of mold 100. It should be understood that use of this particular method for patterning surface 101 of mold 100 results in an inverse image of a projected image (not shown).

FIG. 7 illustrates a cross-section of mold 100 that has been photolithographically prepared as previously discussed in FIG. 1. Briefly, radiation sensitive layer 706, such as photoresist or PMMA is applied to major surface or a surface 701 of mold 100. Radiation sensitive layer 706 is then exposed and developed as previously described hereinabove, thus forming islands 708 of radiation sensitive material covering unexposed portions 715, as well as exposing portions 707 of surface 701. Additionally, it should be understood that sidewalls 709 of islands 708 are capable of being made in a variety of shapes, such as undercut sidewalls, overcut sidewalls, and vertical sidewalls. As illustrated in FIG. 7 and in a preferred embodiment of the present invention, undercut sidewalls 709 of islands 708 are used so as to enhance a subsequent deposition of a metal material.

Referring now to both FIGS. 7 and 8, FIG. 8 illustrates a cross-sectional view of mold 100 after the subsequent metal or metal alloy deposition that forms a discontinuous layer 802 that includes portions 803 and 804.

Generally, deposition of discontinuous layer 802 is accomplished by depositing any suitable metal or a metal alloy, such as aluminum, titanium-tungsten alloy (titungsten), nickel. Deposition of discontinuous layer 802 is achieved by any suitable method well known in the art, such as sputtering, evaporation, or the like. Portions 803 and 804 of discontinuous layer 802 are located on surfaces 704 and on portions 707, respectively. A displacement opening or gap 806 is formed because of a relative height difference between portions 803 and 804, thus breaking up or separating metal portions 803 and 804 of discontinuous layer 802. In a preferred embodiment of the present invention, a thickness 810 of discontinuous layer 802 is 1,000 angstroms less than a thickness 811 of islands 708, thus consistently generating gap 806.

In a preferred embodiment of the present invention, nickel metal material is deposited on exposed surfaces 707 and on top of islands 708, thus forming portions 804 between islands 708 and forming portions 803 on islands 708. Additionally, since radiation sensitive islands 708 are made of an organic material, deposition of the metal or the metal alloy usually is accomplished by using a cool metal deposition process, such as a cool evaporation process or a cool sputtering process.

After deposition of metal portions 803 and 804 is completed, radiation sensitive material 708 and metal portions 803 are removed by a lift-off method. Typically, the lift-off method is accomplished by dissolving or washing away radiation sensitive portions 708 from under metal portions 803, thus removing support for metal portions 803 and lifting metal portion 803 away from major surface 701. In addition, portions 804 are retained on surface 701, thereby providing an etch mask for a subsequent etch process. Generally, removal of islands 708 typically is accomplished by applying a solvent, such as photoresist stripper, acetone, or the like.

Further, once islands 708 and portions 803 are removed from mold 100, mold 100 is now capable of being use to mold objects without additional processing steps.

FIG. 9 is a cross-sectional view of mold 100 after the lift-off method has been completed, thereby retaining portion 804 and exposing portions 901 of surface 701.

Once the lift-off method has been completed, mold 100 is capable of being etched by the gaseous plasma etching method previously described in FIGS. 2, 3, 5 and 6 with associated text. However, in a preferred embodiment of the present invention as illustrated in FIGS. 7-9, ion milling is used to etch portions 901 to desired depth (not shown).

Briefly, ion milling uses a gaseous plasma as previous described with reference to anisotropic process parameters. However, gases that are selected are chemically inert, thus providing only a physical component and not providing any chemical component to etching of portions 901. Moreover, since only physical reactions are used in ion milling, both portions 901 and islands 804 are removed at approximately an equal rate. Depending upon the desired depth, processing of surface 701 through processes described in FIGS. 7-9 is capable of being achieved.

Figure 10:
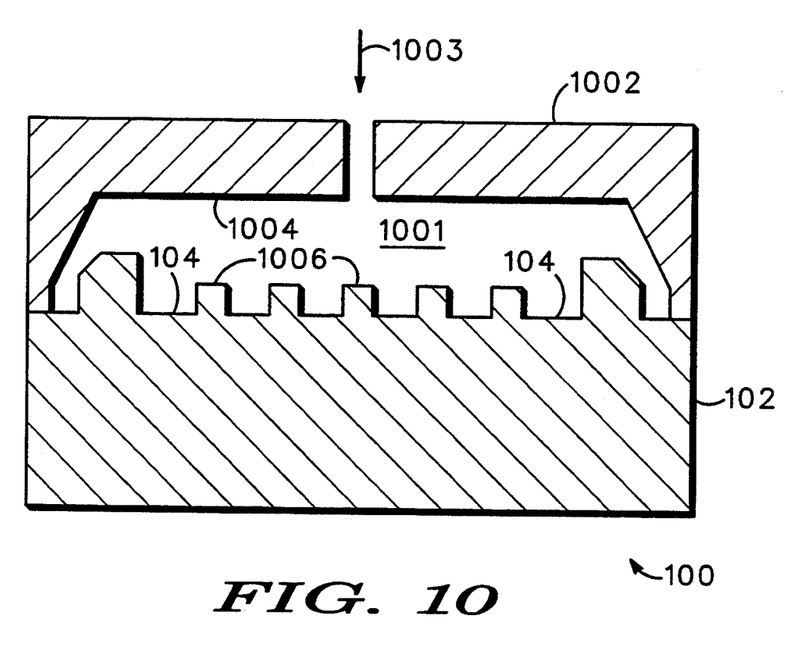
FIG. 10 is a simplified enlarged cross-section of a mold and a molded cladding layer.

FIG. 10 illustrates a simplified cross-sectional view of an optical portion, i.e., a cladding layer 1001 and mold 100 in which cladding layer 1001 is being molded as described hereinabove to form a molded waveguide. Briefly, mold 100 having substrate 102 and upper portion 1002 are firmly secured together. A molding material is injected or squeezed, illustrated by arrow 1003, into a cavity (not shown) that is now cladding layer 1001. Generally, any suitable molding material is capable of being used, such as plastics, polyimides, epoxies, and the like. Injection of the molding material into mold 100 allows a transfer of surfaces 1004 and 104 to cladding layer 1001. Once the molding of cladding layer 1001 is completed, cladding layer 1001 is removed from the mold and a core material (not shown) is applied to the cladding layer 1001 so as to fill grooves 1006 of cladding layer 1001, thereby forming a waveguide. Generally, core material are made of resins, plastic, epoxies, polyimides, and the like. Additionally, another cladding layer is capable of being molded and applied on cladding layer 1001 to cover grooves 1006 of cladding layer 1001. It should be understood that the above description is only a brief recitation utilizing mold 100 and that a more detailed description of molding and material used to make waveguides is found in copending application bearing U.S. Ser. No. 07/889,335, titled MOLDED WAVEGUIDE AND METHOD OF MAKING SAME, and filed May 8, 1992, now U.S. Pat. No. 5,265,184.

Further, it should be understood that mold 100 is capable of being used to make core regions as disclosed in copending application that bearing U.S. Ser. No. 08/019,731, titled MOLDED WAVEGUIDE WITH A UNITARY CLADDING REGION AND METHOD OF MAKING, filed Feb. 19, 1993. Briefly, a core region is first molded in mold 100. Once the molding of the core region is completed, the core region is removed from mold 100 and placed into another mold that overmolds or coats the core region to form a waveguide.

By now it should be appreciated that a novel method using photolithography and etching has been described for making or patterning a mold. The method allows for finer resolution of features as well as a variety of sidewall structures to be formed. Further, a variety of shapes are capable of being photolithographically produced and transferred into the mold.

We claim:

1. A method for patterning a mold comprising the steps of:

providing a mold substrate having a major surface;

applying a radiation sensitive film onto the major surface of the mold substrate;

exposing the radiation sensitive film on the mold substrate to a pattern of light having areas of illumination and areas of non illumination, thereby generating exposed areas where the radiation sensitive film has been illuminated and generating unexposed areas where the radiation sensitive film has not been illuminated;

developing the radiation sensitive film on the major surface of the mold substrate, wherein the developing removes the exposed areas of the radiation sensitive film and the unexposed areas of the radiation sensitive film remain on the major surface of the mold substrate, thereby generating a pattern with open portions on the major surface of the mold substrate and with covered portions on the major surface of the mold substrate; and etching the major surface of the mold substrate by dry etching, thereby removing material from the open portions of the major surface and transferring the pattern to the major surface of the mold substrate.

2. A method for patterning a mold as claimed in claim 1 further comprising the step of:

removing the covered portions on the major surface of the mold substrate after the step of etching.

3. A method for patterning a mold as claimed in claim 1 wherein the step of applying the radiation sensitive layer is accomplished by applying a PMMA material.

4. A method for patterning a mold as claimed in claim 1 wherein the step of applying the radiation sensitive layer is accomplished by applying a photoresist material.

5. A method for patterning a mold as claimed in claim 1 wherein the step of exposing the radiation sensitive film is accomplished by exposing the radiation sensitive film with a projection exposing system.

6. A method for patterning a mold as claimed in claim 1 wherein the step of providing the mold substrate is achieved by providing a mold substrate made of metal.

7. A method for patterning a mold as claimed in claim 6 wherein the providing of a mold substrate made of metal is accomplished by selecting a metal from a group comprising steel, high carbon steel, and stainless steel.

8. A method for transferring a pattern to a mold comprising the steps of:

providing a mold substrate having a major surface;

forming a radiation resist pattern on the mold substrate that exposes portions of the mold substrate while other portions of the mold substrate are covered by the radiation resist pattern;

depositing a metal layer on the exposed portion of the mold substrate and on the radiation resist pattern such that a thickness of the deposited metal layer is less than a thickness of the radiation resist pattern;

removing the radiation resist pattern from the mold substrate, thereby lifting-off the metal layer on the radiation resist pattern, thereby leaving the metal layer on the mold substrate that masks portions of the mold substrate; and etching the major surface of the mold substrate with the patterned masking layer, thereby removing exposed portions of the major surface of the mold substrate, and thereby transferring a pattern from the patterned masking layer to the major surface of the mold substrate.

9. A method for making a mold as claimed in claim 8 wherein the step of depositing a metal layer is achieved by selecting a metal material comprising a group of aluminum, aluminum alloys, nickel, nickel alloys, titanium, titanium alloys, tungsten, and tungsten alloys.

10. A method for making a mold as claimed in claim 9 wherein the step of etching the major surface of the mold substrate is achieved by dry etching.

11. A method for making a mold as claimed in claim 10 wherein the dry etching is achieved in a gaseous plasma containing a halogen constituent.

12. A method for making a mold as claimed in claim 9 wherein the step of etching the major surface of the mold substrate is achieved by wet etching.

13. A method for making a mold as claimed in claim 8 wherein the wet etching is achieved with a solution comprising at least hydrofluoric acid and nitric acid.

14. A method for making a mold comprising the steps of:

providing a mold substrate having a major surface;

forming an oxide layer on the major surface of the mold substrate;

forming a mask pattern on the oxide layer of the major surface of the mold substrate, thereby exposing portions of the oxide layer while other portions of the oxide layer are unexposed;

etching the exposed portions of the oxide layer, thereby selectively removing the exposed portions of the oxide layer on the major surface and transferring the mask pattern to the oxide layer, and thereby exposing portions of the major surface of the mold substrate; and etching the exposed portions of the major surface of the mold substrate, thereby patterning the mold.

15. A method for transferring a pattern to a mold comprising the steps of:

providing a mold substrate having a major surface;

forming a radiation resist pattern on the mold substrate that exposes portions of the mold substrate while other portions of the mold substrate are covered by the radiation resist pattern;

depositing a metal layer on the exposed portion of the mold substrate and on the radiation resist pattern such that a thickness of the deposited metal layer is less than a thickness of the radiation resist pattern; and removing the radiation resist pattern from the mold substrate, thereby lifting-off the metal layer on the radiation resist pattern, thereby leaving the metal layer on the mold substrate that masks portions of the mold substrate, thereby fabricating a mold.

16. A method for making a waveguide using a mold comprising the steps:

providing a mold substrate having a major surface;

forming a patterned masking layer on the major surface of the mold substrate that exposes portions of the major surface of the mold substrate while other portions are covered by the patterned masking layer;

etching the major surface of the mold substrate with the patterned masking layer, thereby removing exposed portions of the major surface of the mold substrate, and thereby transferring a pattern from the patterned masking layer to the major surface of the mold substrate;

providing an upper portion of a mold;

securing the upper portion of the mold to the mold substrate to enclose the pattern transferred by etching between the upper portion and the substrate of the mold; and injecting a molding material in the mold, thereby making an optical portion for a waveguide.

17. A method for making a mold comprising the steps of:

providing a mold substrate having a major surface;

forming a dielectric layer on the major surface of the mold substrate;

forming a mask pattern on the dielectric layer of the major surface of the mold substrate, thereby exposing portions of the dielectric layer while other portions of the dielectric layer are unexposed;

etching the exposed portions of the dielectric layer, thereby selectively removing the exposed portions of the dielectric layer on the major surface and transferring the mask pattern to the dielectric layer, and thereby exposing portions of the major surface of the mold substrate; and etching the exposed portions of the major surface of the mold substrate, thereby patterning the mold.

18. A method for making a waveguide using a mold comprising the steps:

providing a mold substrate having a major surface;

forming a patterned masking layer on the major surface of the mold substrate that exposes portions of the major surface of the mold substrate while other portions are covered by the patterned masking layer;

etching the major surface of the mold substrate by dry etching having the patterned masking layer, thereby removing exposed portions of the major surface of the mold substrate, and thereby transferring a pattern from the patterned masking layer to the major surface of the mold substrate;

providing an upper portion of a mold;

securing the upper portion of the mold to the mold substrate to enclose the pattern transferred by etching between the upper portion and the substrate of the mold; and injecting a molding material in the mold.

* * * * *